United States Patent
Kim

(10) Patent No.: US 7,161,918 B2
(45) Date of Patent: Jan. 9, 2007

(54) MOBILE STATION SERVICE IN MOBILE COMMUNICATION SYSTEM

(75) Inventor: Jung-Hwan Kim, Kyungki-Do (KR)

(73) Assignee: LG-Nortel Co., Ltd., Seoul (KR)

( * ) Notice: Subject to any disclaimer, the term of this patent is extended or adjusted under 35 U.S.C. 154(b) by 933 days.

(21) Appl. No.: 10/029,279

(22) Filed: Dec. 28, 2001

(65) Prior Publication Data

US 2002/0085523 A1    Jul. 4, 2002

(30) Foreign Application Priority Data

Dec. 29, 2000   (KR) ............................... 2000-85760

(51) Int. Cl.
*H04B 7/216* (2006.01)
(52) U.S. Cl. ..................... 370/335; 370/342
(58) Field of Classification Search ................ 370/335, 370/342
See application file for complete search history.

(56) References Cited

U.S. PATENT DOCUMENTS

| | | | | |
|---|---|---|---|---|
| 5,832,384 A | * | 11/1998 | Balachandran et al. | 455/450 |
| 6,154,655 A | * | 11/2000 | Borst et al. | 455/451 |
| 6,188,906 B1 | * | 2/2001 | Lim et al. | 455/453 |
| 6,212,388 B1 | * | 4/2001 | Seo | 455/450 |
| 6,898,431 B1 | * | 5/2005 | Peele | 455/453 |
| 2002/0019235 A1 | * | 2/2002 | Kim et al. | 455/451 |

* cited by examiner

*Primary Examiner*—Hassan Kizou
*Assistant Examiner*—Anthony Sol
(74) *Attorney, Agent, or Firm*—Fleshner & Kim, LLP

(57) ABSTRACT

A mobile communication system and a mobile station service method in the mobile communication system is disclosed, and enables mobile terminals of a second generation (IS-95, IS-95B) and a third generation (IS-2000) to be operated using a CDMA Channel List and an Extended CDMA Channel List. The method preferably includes checking whether a frequency on service presently exists on a CDMA Channel List and an Extended CDMA Channel List when a service frequency of a base station is changed, copying the frequency allocated to the Extended CDMA Channel List to the CDMA Channel List if the frequency on service fails to exist on the CDMA Channel List, copying the frequency allocated to the CDMA Channel List to the Extended CDMA Channel List if the frequency on service fails to exist on the Extended CDMA Channel List, and transmitting the CDMA and Extended CDMA Channel Lists to which the frequency is copied to a terminal.

23 Claims, 5 Drawing Sheets

FIG. 3
BACKGROUND ART
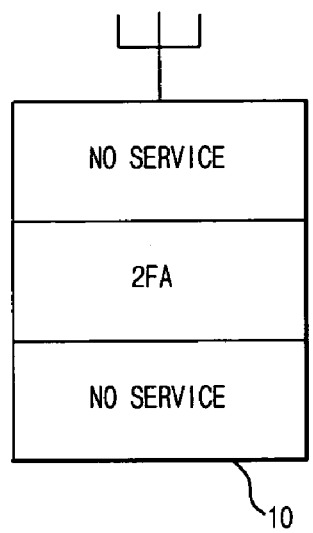
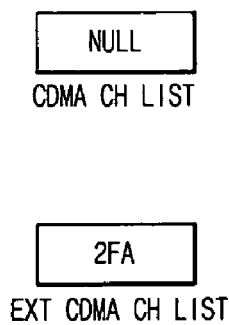
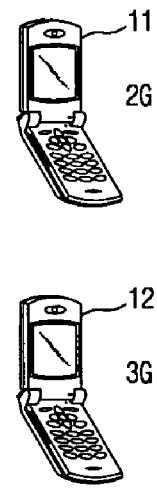
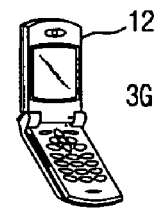
FIG. 4
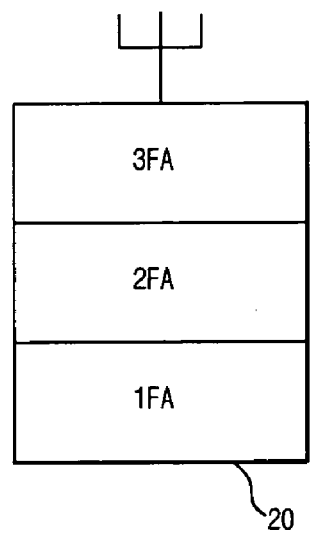
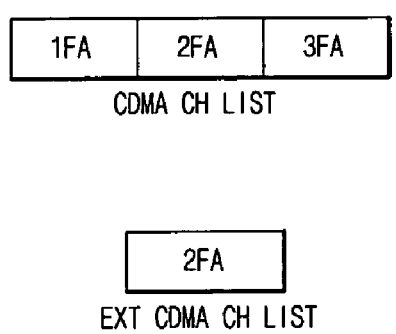
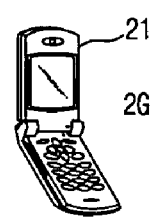
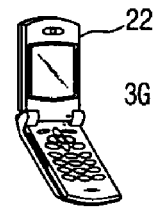

FIG. 5
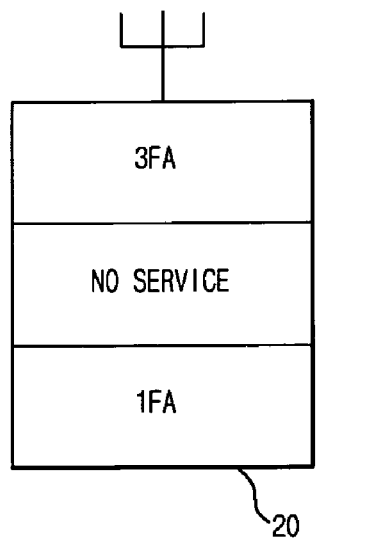
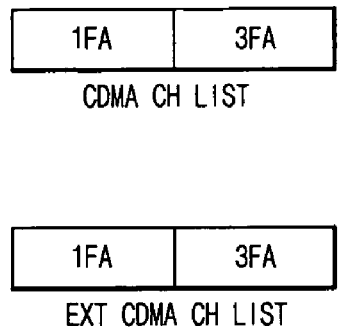
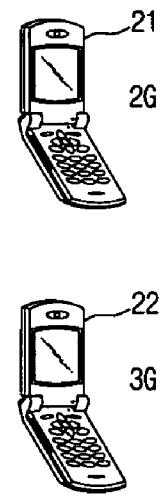
FIG. 6
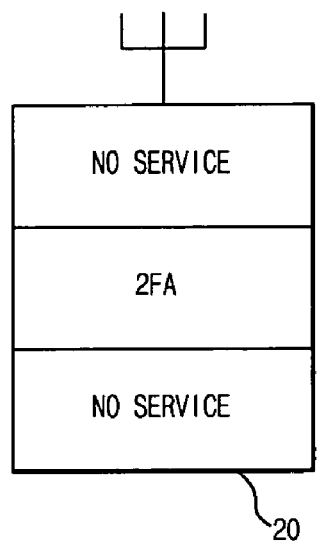
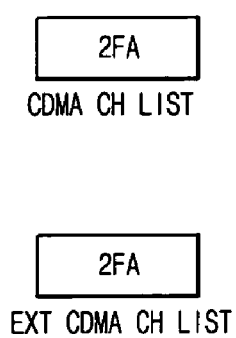
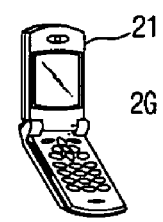
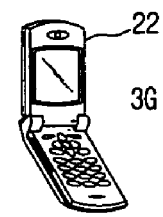

MOBILE STATION SERVICE IN MOBILE COMMUNICATION SYSTEM

BACKGROUND OF THE INVENTION

1. Field of the Invention

The present invention relates to a mobile communication system, and more particularly, to a system and method of providing service to mobile terminals of a second generation (IS-95, IS-95B) and a third generation (IS-2000) using a CDMA Channel List and an extended CDMA Channel List.

2. Background of the Related Art

A base station in a mobile communication transmits a channel list to mobile station to carry out a mobile communication service. The channel list is allocated with a frequency of 1.28 MHz. In this case, the base station selects whether the allocated frequency allocation (FA) is used for the second generation (IS-95,IS-95A,IS-95B) mobile station service 2G or the third generation (IS-2000) 3G mobile station service.

The base station separately administers the FA to be used for 2G and 3G mobile station services in accordance with a recommendation of IS-2000. Generally, 1FA, 3FA, and 4FA are allocated for 2G mobile station service and 2FA is allocated fro 3G mobile station service. In this case, a bundle of FA to be used for 2G mobile station service is defined as a CDMA (code division multiple access) channel list, and a bundle of FA to be used for 3G mobile station service is defined as an Extended CDMA Channel List.

Therefore, a 2G terminal receives a CDMA Channel List and a 3G terminal receives a CDMA Channel List or Extended CDMA Channel List, thereby providing services such as the presently supported voice call, data call and the like.

FIG. 1 to FIG. 3 illustrate related art methods of carrying out mobile communication services. Referring to FIG. 1, a base station 10, which services 1FA, 2FA, and 3FA, allocates 1FA and 3FA to the CDMA Channel List for a 2G mobile terminal 11 in accordance with the IS-2000 recommendation. The base station 10 also allocates 2FA to the Extended CDMA Channel List for a 3G mobile terminal 12 to transmit. Therefore, the 2G mobile terminal 11 carries out services such as voice and data calls and the like by receiving the CDMA Channel List to which 1FA and 3FA are allocated. Similarly, the 3G mobile terminal 12 carries out services such as voice and data calls and the like by receiving the Extended CDMA Channel List to which 2FA is allocated.

Referring to FIG. 2, a base station 10, which services 1FA and 3FA only, allocates 1FA and 3FA to the CDMA Channel List in accordance with the IS-2000 recommendation. Thus no FA is allocated to the Extended CDMA Channel List. Therefore, the 2G mobile terminal 11 carries out services, such as voice and data calls, by receiving the CDMA Channel List to which 1FA and 3FA are allocated. The 3G mobile terminal 12, however, is unable to carry out services such as voice and data calls because no frequency is allocated to the Extended CDMA Channel List.

Referring to FIG. 3, a base station 10, which services 2FA only for the 3G mobile terminal 12, allocates 2FA to the Extended CDMA Channel List, but no FA to the CDMA Channel List. In this case, the 3G mobile terminal is able to carry out normal mobile station services, but the 2G mobile terminal, having no allocated FA to the CDMA Channel List, fails to perform any mobile station service.

In such a manner, the base station transmits the FA allocated to the CDMA Channel List and the Extended Channel List, whereby the 2G and 3G mobile terminals are able to provide subscribers with voice/data calls.

The related art mobile station service methods have various problems. For example, as shown in FIG. 2 and FIG. 3, 2G or 3G mobile station service cannot be carried out unless a FA for the 2G and 3G terminals is allocated thereto by the base station, even if there is a frequency available to provide a service.

Furthermore, a service provider is required to extend a new frequency for the 3G mobile mobile station service. When the 3G mobile terminals are not widely used, however, it is a waste of frequencies to expand the extra-FA for the 3G mobile terminals. Additionally, the 2G mobile terminals provide services through limited FA only, whereby services for random 2G terminals may be rejected.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a mobile communication system and a service method in a mobile communication system that can perform second and third generation mobile station services effectively when a FA for one of second and third generation terminals fails to be allocated to the corresponding mobile terminals.

Another object of the present invention is to provide a mobile communication service and a service method in a mobile communication system that prevents frequency waste by using a FA allocated to a third generation mobile terminal for a second generation mobile mobile station service.

To achieve at least these objects in whole or in parts, there is provided a mobile station service method in a mobile communication system including checking whether a frequency on service presently exists on a CDMA Channel List and an Extended CDMA Channel List when a service frequency of a base station is changed, copying the frequency allocated to the Extended CDMA Channel List to the CDMA Channel List if the frequency on service fails to exist on the CDMA Channel List, copying the frequency allocated to the CDMA Channel List to the Extended CDMA Channel List if the frequency on service fails to exist on the Extended CDMA Channel List, and transmitting the CDMA and Extended CDMA Channel List to which the frequency is copied to a terminal.

Preferably, the step of copying the frequency allocated to the Extended CDMA Channel List to the CDMA Channel List if the frequency on service fails to exist on the CDMA Channel List, includes checking whether the CDMA Channel List is changed, checking whether the frequency on service presently exists on the CDMA Channel List when the CDMA Channel List is changed, checking whether the frequency on service presently exists on the Extended CDMA Channel List when the frequency fails to exist on the CDMA Channel List, and copying the frequency allocated to the Extended CDMA Channel List to the CDMA Channel List when the frequency exists on the Extended CDMA Channel List.

Preferably, the step of copying the frequency allocated to the CDMA Channel List to the Extended CDMA Channel List if the frequency on service fails to exist on the Extended CDMA Channel List, includes checking whether the Extended CDMA Channel List is changed, changing items of the CDMA Channel List in a same manner that items of the Extended CDMA channel list are changed when the Extended CDMA Channel List is changed, checking whether the frequency on service presently exists on the changed Extended CDMA Channel List, checking whether the frequency on service presently exists on the CDMA Channel List when the frequency fails to exist on the Extended CDMA Channel List, and copying the frequency allocated to the CDMA Channel List to the Extended CDMA Channel List when the frequency on service presently exists on the CDMA Channel List.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a drawing illustrating a related art service method for a terminal in a mobile communication system when a frequency is allocated to Extended CDMA Channel List only;

FIG. 4 is a drawing illustrating a service method for a terminal in a mobile communication system according to a preferred embodiment of the present invention when a frequency is allocated to the CDMA Channel List and the Extended CDMA Channel List;

FIG. 5 is a drawing illustrating a service method for a terminal in a mobile communication system according to the preferred embodiment when a frequency is allocated to the CDMA Channel List only;

FIG. 6 is a drawing illustrating a service method for a terminal in a mobile communication system according to the preferred embodiment when a frequency is allocated to the Extended CDMA Channel List only;

DETAILED DESCRIPTION OF PREFERRED EMBODIMENTS

Figure 1:
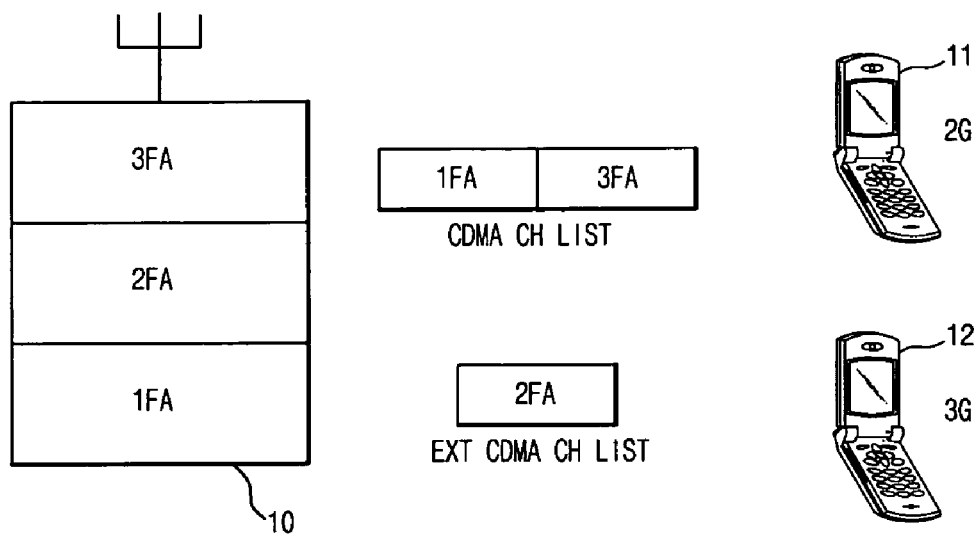
FIG. 1 is a drawing illustrating a related art service method for a terminal in a mobile communication system when a frequency is allocated to CDMA Channel List and Extended CDMA Channel List.
Figure 2:
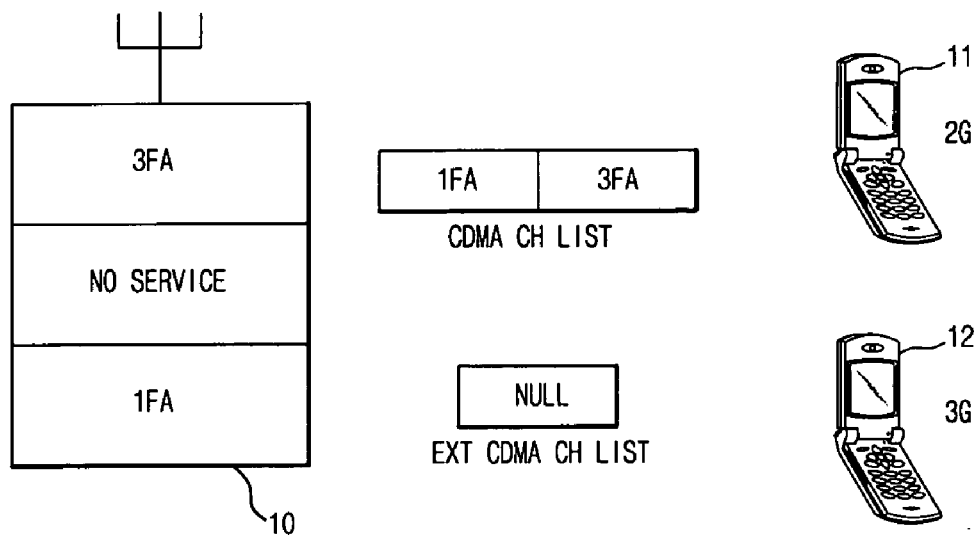
FIG. 2 is a drawing illustrating a related art service method for a terminal in a mobile communication system when a frequency is allocated to CDMA Channel List only.

In a communication system and mobile station service method in a mobile communication system according to the preferred embodiment. A base station transmits a Synchronization channel message on a Synchronization Channel in all frequency allocation which includes an information which is related to a service capability of base station. A frequency allocated to the CDMA Channel List is preferably copied as an Extended CDMA Channel List to be transmitted or Extended CDMA Channel List is transmitted on Paging Channel in the frequency when the frequency is allocated to the CDMA Channel List only. Additionally, a frequency allocated to the Extended CDMA Channel List is preferably copied as a CDMA Channel List to be transmitted and the Extend CDMA channel list is transmitted on the Paging Channel when the frequency is allocated only to the Extended CDMA Channel List, Moreover, a frequency that is allocated to the Extended CDMA Channel List is preferably included in a CDMA Channel List when the frequency is allocated to both of the CDMA and Extended CDMA lists. The above operation is preferably also carried out when the frequency allocation (FA) of the CDMA and Extended CDMA Channel Lists is added and/or changed.

FIG. 4 illustrates a service method for a terminal in a mobile communication system according to the preferred embodiment when a frequency is allocated to the CDMA Channel List and the Extended CDMA Channel List. FIG. 5 illustrates a service method for a terminal in a mobile communication system for which a frequency is allocated only to the CDMA Channel List. FIG. 6 illustrates a service method for a terminal in a mobile communication system for which a frequency is allocated only to the Extended CDMA Channel List.

Referring to FIG. 4, a base station 20 that supports all frequency allocations 1FA to 3FA preferably allocates 1FA to 3FA to the CDMA Channel List, and allocates 2FA to Extended CDMA Channel List. In other words, the CDMA Channel List and the Extended Channel List is transmitted on Paging Channel in all Frequency allocations. When frequency allocations 1FA and 3FA are allocated for a frequency of a present 2G mobile terminal 21 and frequency allocation 2FA is allocated for a frequency of a 3G mobile terminal 22, the base station 20 preferably included the frequency (2FA) of the Extended CDMA Channel List in the CDMA Channel List to transmit.

Therefore, the 2G mobile terminal 21 carries out services such as a voice call, a data call and the like by receiving the CDMA list to which frequency allocations 1FA to 3FA are allocated. The 3G mobile terminal 22 carries out services such as a voice call, a data call and the like by receiving the Extended CDMA list to which 2FA is allocated. The mobile terminal determines and sets the service according to the CDMA Channel List or the Extended Channel List. Thus, if 3G mobile terminals 22 fail to be widely supplied to users, the preferred embodiment provides for the effective use of the frequencies by using 2FA with both the 2G mobile terminal 21 and the 3G mobile terminal 22.

Referring to FIG. 5 and FIG. 6, when the frequency allocation (FA) is changed so that the base station 20 only services frequency 1FA and 3FA for the 3G mobile terminal 22, the base station 20 copies the frequency 1FA and 3FA allocated to the CDMA Channel List to the Extended CDMA list to transmit and the CDMA Channel List is transmitted on Paging Channel. Similarly, the base station 20 copies the frequency 2FA allocated to the Extended CDMA Channel List to the CDMA Channel List to transmit and the Extended CDMA Channel List is transmitted on Paging Channel. Therefore, when only the frequency 1FA and 3FA are being serviced for the 2G mobile terminal 21, or when the frequency 2FA is being serviced only for the 3G mobile terminal 21, The mobile terminal determines and sets the service according to the CDMA Channel List or the Extended Channel List. Therefore, the preferred embodiment enables both of the 2G and 3G mobile terminals 21 and 22 to normally carry out mobile station services using the available FAs.

Figure 7:
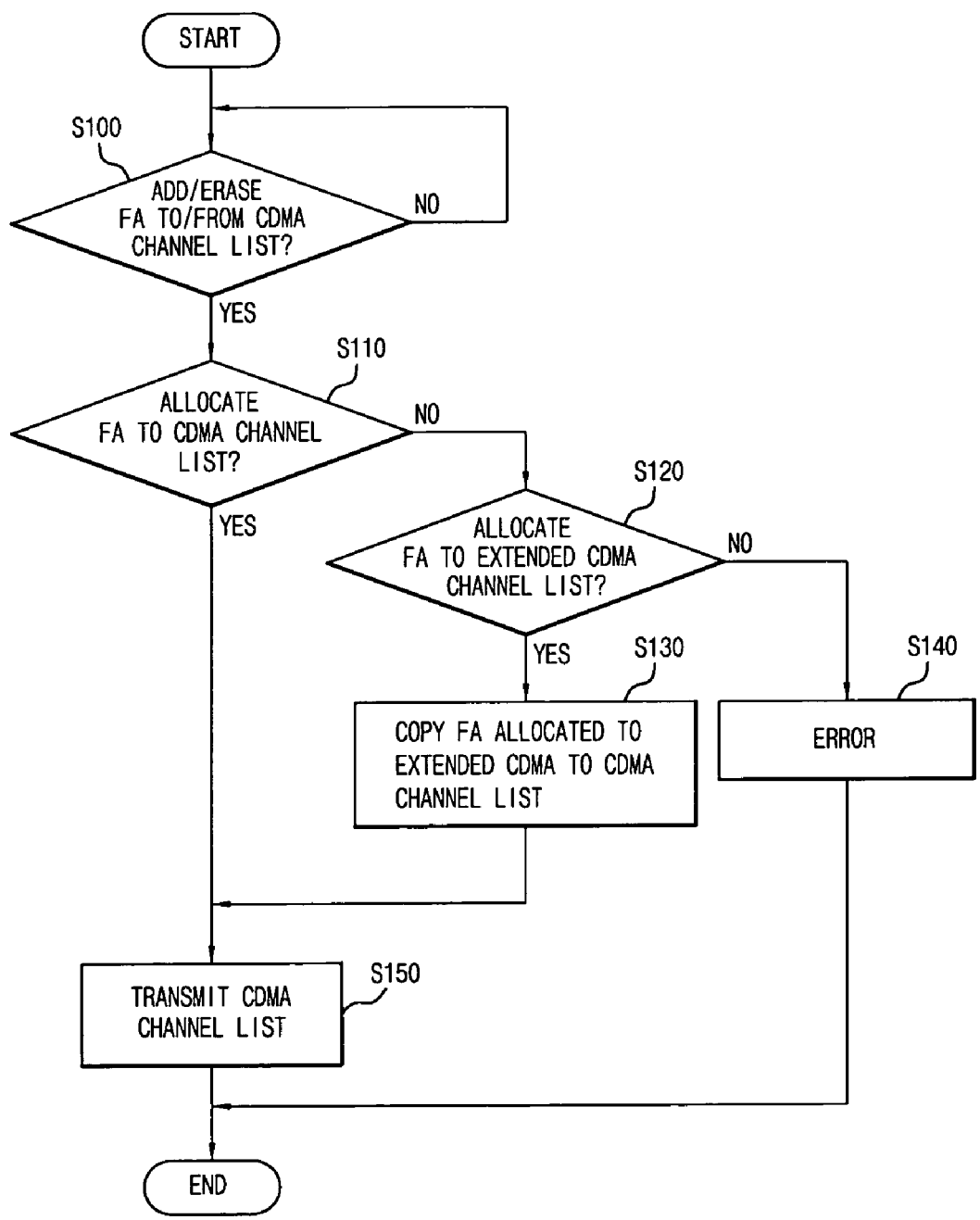
FIG. 7 is a flowchart illustrating a service method for a terminal in a mobile communication system according to the preferred embodiment when a frequency of CDMA Channel List is changed.
Figure 8:
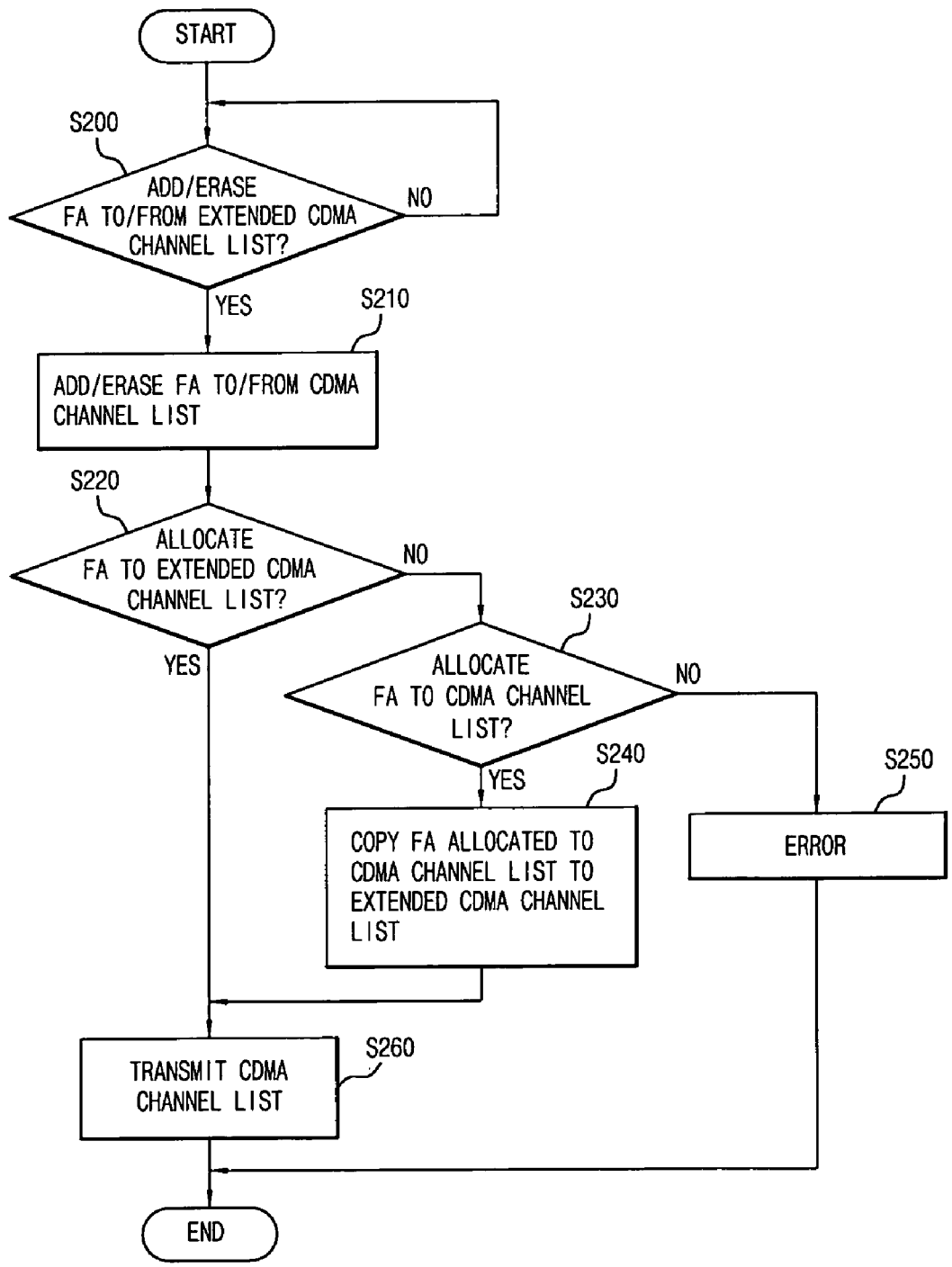
FIG. 8 is a flowchart illustrating a service method for a terminal in a mobile communication system according to the preferred embodiment when a frequency of the Extended CDMA Channel List is changed.

A service method in a mobile communication system according to the preferred embodiment invention is next described by referring to flowcharts in FIG. 7 and FIG. 8.

Referring to FIG. 7, the base station 20 first checks to determine whether the CDMA Channel List has been changed (S100). If the CDMA Channel List has not been changed, the base station 20 preferably repeats the above checking process. If, however, the CDMA Channel List has been changed, a main processor (not shown in the drawing) of the base station 20 determines whether a frequency FA that is presently in service exists on the changed CDMA Channel List (S110). If any frequency fails to exist on the CDMA Channel List in accordance with the result of the determination, the main processor checks to determine whether a frequency, which is presently in service, exists on the Extended CDMA Channel List (S120). If the in-service frequency is found to exist on the Extended CDMA Channel List, as shown in FIG. 6, the main processor copies the frequency, (for example, 2FA) allocated to the Extended CDMA Channel List to the CDMA Channel List (S130), and the CDMA Channel List is transmitted on the Paging Channel to the 2G mobile terminal (S150).

If the frequency 2FA is not allocated to the Extended CDMA Channel List, the base station 20 preferably settles the matter as an error (S140). Also, if the FA in service already exists on the CDMA Channel List at step S110, the corresponding changed CDMA Channel List is transmitted on the Paging Channel as is to the 2mobile terminal (S150).

Referring to FIG. 8, a processes when a frequency of an Extended CDMA Channel List is changed is described. As shown in FIG. 8, the main processor (not shown in the drawing first checks to determine whether the Extended CDMA Channel List has been changed (S200). If the Extended CDMA Channel List has been changed, the CDMA Channel List is preferably also changed in a manner similar to how the Extended CDMA Channel List has been changed (S210). For instance, if 2FA is erased from the Intended CDMA Channel List, 2FA is preferably also removed from the CDMA Channel List.

Thereafter, the main processor determines whether the active/available FA presently exists on the Extended CDMA Channel List (S220). If any frequency is determined not to exist on the Extended CDMA Channel List, the main processor checks to determine whether an active/available frequency exists on the CDMA Channel List (S230). If the active/available frequency currently exists on the CDMA Channel List as shown in FIG. 5, the main processor copies the frequency (for example, 1FA and 3FA) allocated to the CDMA Channel List to the Extended CDMA Channel List (S240) and the Extended CDMA Channel List is transmitted on the Paging Channel to the 3G mobile terminal (S260). If the frequency 1FA and 3FA fail to be allocated to the CDMA Channel List, the base station 20 preferably settles the matter as an error (S250).

If, however, the active/available FA currently exists on the Extended CDMA Channel List at step S220, the corresponding changed Extended CDMA Channel List is transmitted on the Paging Channel, as is, to the 3G mobile terminal (S260).

The communication system and frequency allocation method, as described with respect to the preferred embodiment, has many advantages. For example, when a frequency is allocated only to the CDMA Channel List, the allocated frequency is copied from the CDMA Channel List to the Extended CDMA Channel List to transmit and the CDMA Channel List is transmitted on the Paging Channel. Additionally, when the frequency is allocated only to the Extended CDMA Channel List, the allocated frequency is copied from the Extended CDMA Channel List to the CDMA Channel List to transmit and the the Extended CDMA Channel List is transmitted on the Paging Channel. The mobile terminal determines and sets the service according to the CDMA Channel List or the Extended Channel List.

In the above explanation, The Extended Channel List is possible to include an information related to the service capability of the base station which is not transmitted on the Synchronization Channel in all frequency allocation.

Therefore, the second and third generation mobile station services can be carried out effectively and without wasting frequencies.

Moreover, when a frequency is allocated to both of the CDMA Channel List and the Extended CDMA Channel List, the frequency allocated to the Extended CDMA Channel List is included in the CDMA Channel List so that FA allocated for the third generation mobile terminal can be used for the second generation mobile terminal. Therefore, a wasting of frequencies is further prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile station service method in a mobile communication system, comprising:
   determining whether a frequency exists on each of a CDMA Channel List and an Extended CDMA Channel List when a service frequency of a base station is changed;
   copying a frequency allocated to the Extended CDMA Channel List to the CDMA Channel List if the frequency is determined not to exist on the CDMA Channel List; and
   copying a frequency allocated to the CDMA Channel List to the Extended CDMA Channel List if the frequency is determined not to exist on the Extended CDMA Channel List, and
   wherein the CDMA Channel List comprises a bundle of frequency allocations usable for second generation (2G) mobile station service and the Extended CDMA Channel List comprises a bundle of frequency allocations usable for third generation (3G) mobile station service.

2. The method of claim 1, further comprising transmitting the CDMA and Extended CDMA Channel Lists to a mobile terminal.

3. The method of claim 1, wherein the mobile terminal is one of a second generation mobile terminal and a third generation mobile terminal.

4. The method of claim 1, further comprising transmitting the CDMA Channel List by including in the CDMA Channel List the frequency allocated to the Extended CDMA Channel List if the frequency exists on both of the CDMA and Extended CDMA Channel Lists.

5. The method of claim 1, wherein copying the frequency allocated to the Extended CDMA Channel List to the CDMA Channel List comprises:

determining whether the CDMA Channel List has been changed;

determining whether a prescribed frequency exists on the CDMA Channel List when the CDMA Channel List is changed;

determining whether the prescribed frequency exists on the Extended CDMA Channel List when the prescribed frequency is determined not to exist on the CDMA Channel List; and copying the prescribed frequency allocated to the Extended CDMA Channel List to the CDMA Channel List when die prescribed frequency exists on the Extended CDMA Channel List.

6. The method of claim 1, wherein copying the frequency allocated to the CDMA Channel List to the Extended CDMA Channel List comprises:

determining whether the Extended CDMA Channel List has been changed;

changing items of the CDMA Channel List such that items of the Extended channel list are changed on the CDMA Channel List when the Extended CDMA Channel List is changed;

determining whether the prescribed frequency exists on the changed Extended CDMA Channel List;

determining whether the prescribed frequency exists on the CDMA Channel List when the prescribed frequency is determined not to exist on the Extended CDMA Channel List; and copying the prescribed frequency allocated to the CDMA Channel List to the Extended CDMA Channel List when the prescribed frequency exists on the CDMA Channel List.

7. A mobile station service method in a mobile communication system, comprising:

determining whether a CDMA Channel List has been changed;

determining whether a prescribed frequency exists on the CDMA Channel List when the CDMA Channel List is determined to have been changed;

determining whether the prescribed frequency exists on an Extended CDMA Channel List when the prescribed frequency fails to exist on the CDMA Channel List; and copying the prescribed frequency allocated to the Extended CDMA Channel List to the CDMA Channel List when the prescribed frequency exists on the Extended CDMA Channel List, and wherein the CDMA Channel List comprises a bundle of frequency allocations usable for 2G mobile station service and the Extended CDMA Channel List comprises a bundle of frequency allocations usable for 3G mobile station service.

8. The method of claim 7, further comprising transmitting the CDMA Channel List to which the frequency has been copied to a mobile terminal.

9. The method of claim 7, further comprising transmitting the changed CDMA Channel List as is to a mobile terminal if the prescribe frequency exists on the CDMA Channel List.

10. A mobile station service method in a mobile communication system, comprising:

determining whether an Extended CDMA Channel List has been changed;

changing items of a CDMA Channel List in a manner identical to the Extended CDMA Channel List if it is determined that the Extended CDMA Channel List has been changed;

determining whether a prescribed frequency exists on the changed Extended CDMA Channel List;

determining whether the prescribed frequency exists on the CDMA Channel List when the frequency fails to exist on the Extended CDMA Channel List; and copying the prescribed frequency allocated to the CDMA Channel List to the Extended CDMA Channel List when the prescribed frequency exists on the CDMA Channel List, and wherein the CDMA Channel List comprises a bundle of frequency allocations usable for 2G mobile station service and the Extended CDMA Channel List comprises a bundle of frequency allocations usable for 3G mobile station service.

11. The method of claim 10, further comprising transmitting the Extended CDMA Channel List to which the frequency is copied to a mobile terminal.

12. The method of claim 11, wherein the mobile terminal is one of a second generation mobile terminal and a third generation mobile terminal.

13. The method of claim 10, further comprising transmitting the changed Extended CDMA Channel List as is to a mobile terminal if the prescribed frequency exists on the Extended CDMA Channel List.

14. A method of managing frequency allocations in a mobile communication system, comprising:

updating a CDMA Channel list to include a frequency allocated on an Extended CDMA Channel list;

updating the Extended CDMA Channel list to include a frequency allocated to the CDMA Channel list; and transmitting each of the CDMA Channel list and the Extended CDMA Channel list to at least one mobile terminal, and wherein the CDMA Channel list comprises a bundle of frequency allocations usable for 2G mobile station service and the Extended CDMA Channel list comprises a bundle of frequency allocations usable for 3G mobile station service.

15. The method of claim 14, wherein if an allocated frequency is removed from the channel list from which the allocated frequency originated, the other channel list is updated to remove the allocated frequency.

16. The method of claim 14, wherein the at least one mobile terminal is one of a second generation mobile terminal and a third generation mobile terminal.

17. A communication system, comprising:

a base station configured to allocate frequencies of a CDMA channel list and an Extended CDMA channel list; and at least one mobile terminal configured to receive one of the CDMA channel list and the Extended CDMA channel list according to a terminal type, wherein the terminal type is one of a second generation (2G) terminal and a third generation (3G) terminal, and wherein the base station is configured to copy frequencies allocated on the CDMA channel list to the Extended CDMA channel list, and to copy frequencies allocated on the Extended CDMA channel list to the CDMA channel list, and wherein the CDMA channel list comprises a bundle of frequency allocations usable for 2G mobile station service and the Extended CDMA channel list comprises a bundle of frequency allocations usable for 3G mobile station service.

18. The system of claim 17, wherein if the Extended CDMA channel list is changed, the base station is configured to update the CDMA channel list to reflect the change to the Extended CDMA channel list.

19. The system of claim 17, wherein if the CDMA channel list is changed, the base station is configured to update the Extended CDMA channel list to reflect the change to the CDMA channel list.

20. The system to claim 17, wherein the 2G terminal is configured to receive the CDMA channel list and the 3G terminal is configured to receive the Extended CDMA channel list.

21. A method of supporting a mobile station service in a mobile communication system comprising:
   transmitting a Synchronization Channel Message on a Synchronization Channel in a frequency which is related to a service capability of the base station; and
   copying a frequency allocated to the Extended CDMA Channel List to the CDMA Channel List if the frequency is determined not to exist on the CDMA Channel List; and
   copying a frequency allocated to the CDMA Channel List to the Extended CDMA Channel List if the frequency is determined not to exist on the Extended CDMA Channel, and
   transmitting the CDMA Channel List and the Extended CDMA Channel List on a Paging Channel in the frequency, and
   wherein the CDMA Channel List comprises a bundle of frequency allocations usable for 2G mobile station service and the Extended CDMA Channel List comprises a bundle of frequency allocations usable for 3G mobile station service.

22. The method of claim 21, further comprising the mobile station finally setting a service according to one of the CDMA Channel List and an Extended CDMA Channel List.

23. The method of claim 21, wherein the Extended CDMA Channel List includes an information related to the service capability of the base station which is not transmitted on Synchronization Channel.

* * * * *